(12) United States Patent
Okawara

(10) Patent No.: US 7,570,879 B2
(45) Date of Patent: Aug. 4, 2009

(54) IMAGE SENSING APPARATUS, CONTROL METHOD THEREFOR, AND AUTOMATIC FOCUS ADJUSTING DEVICE FOR IMAGE SENSING APPARATUS

(75) Inventor: Hiroto Okawara, Ibaraki-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 538 days.

(21) Appl. No.: 11/184,281

(22) Filed: Jul. 18, 2005

(65) Prior Publication Data

US 2006/0018649 A1 Jan. 26, 2006

(30) Foreign Application Priority Data

Jul. 26, 2004 (JP) .............................. 2004-217774

(51) Int. Cl.
*G03B 17/00* (2006.01)
(52) U.S. Cl. ..................... 396/77; 396/79; 396/80; 396/91; 396/93; 382/255
(58) Field of Classification Search ................. 396/77, 396/79, 80, 91, 93; 382/255
See application file for complete search history.

(56) References Cited

U.S. PATENT DOCUMENTS

| 5,036,399 | A | * | 7/1991 | Mabuchi | 348/351 |
| 5,369,461 | A | * | 11/1994 | Hirasawa et al. | 396/135 |
| 5,371,566 | A | * | 12/1994 | Asakura | 396/71 |
| 5,387,960 | A | * | 2/1995 | Hirasawa et al. | 396/135 |
| 5,600,371 | A | * | 2/1997 | Arai et al. | 348/335 |
| 5,630,180 | A | * | 5/1997 | Kusaka | 396/63 |
| 5,956,528 | A | | 9/1999 | Tanaka | |
| 6,130,717 | A | * | 10/2000 | Arai et al. | 348/360 |
| 6,392,702 | B1 | * | 5/2002 | Arai et al. | 348/335 |
| 6,650,367 | B1 | * | 11/2003 | Kyuma | 348/240.1 |
| 6,766,111 | B2 | * | 7/2004 | Uenaka et al. | 396/91 |

FOREIGN PATENT DOCUMENTS

| EP | 0 762 742 | | 3/1997 |
| EP | 0762742 | * | 3/1997 |
| JP | 9-009130 | | 1/1997 |

OTHER PUBLICATIONS

European Office Action dated Jul. 26, 2007 concerning corresponding European Patent Application No. 05254553.0.
English Abstract for Japanese Patent Application 9-009130.
European Search Report dated Nov. 8, 2005.
Communication from the EPO concerning the European Search Opinion.

* cited by examiner

*Primary Examiner*—Patrick J Assouad
*Assistant Examiner*—Michael A Strieb
(74) *Attorney, Agent, or Firm*—Cowan, Liebowitz & Latman, P.C.

(57) ABSTRACT

This invention provides a technique of stably focusing on a major object without any sense of discomfort regardless of differences in lens unit type in a camera body on which a lens unit can be detachably mounted. For this purpose, the type of lens unit connected to the camera is determined. Cutoff frequencies are then set for a low-pass filter and high-pass filter on the basis of the determination result. With regard to frequency component data in predetermined area of an image sensor, a peak hold circuit, integrator, and difference peak hold circuit each generate evaluate value information. A camera microcomputer transmits the obtained evaluate value information to a lens microcomputer in the lens unit.

7 Claims, 10 Drawing Sheets

FIG. 5A

| CAMERA BODY |||
|---|---|---|
| TYPE INFORMATION | SUPPORT LENS TYPE | EFFECTIVE PERMISSIBLE CIRCLE OF CONFUSION (μm) |
| CAMERA 1 | LENS 1 | $3\alpha$ |
| CAMERA 2 | LENS 1,2 | $2\alpha$ |
| CAMERA 3 | LENS 1,2,3 | $\alpha$ |

FIG. 5B

| LENS UNIT |||||
|---|---|---|---|---|
| TYPE TINFORMATION | COMPATIBLE CIRCLE OF CONFUSION (μm) | SUPPORT CAMERA TYPE | NUMBER OF STOP POINTS WITHIN FOCAL DEPTH | MINIMUM NUMBER OF CONTROL POINTS |
| LENS 1 | $3\alpha$ | CAMERA 1 | 4 | 1 |
| LENS 2 | $2\alpha$ | CAMERA 1 | 6 | 2 |
| | | CAMERA 2 | 4 | 1 |
| LENS 3 | $\alpha$ | CAMERA 1 | 12 | 3 |
| | | CAMERA 2 | 8 | 2 |
| | | CAMERA 3 | 4 | 1 |

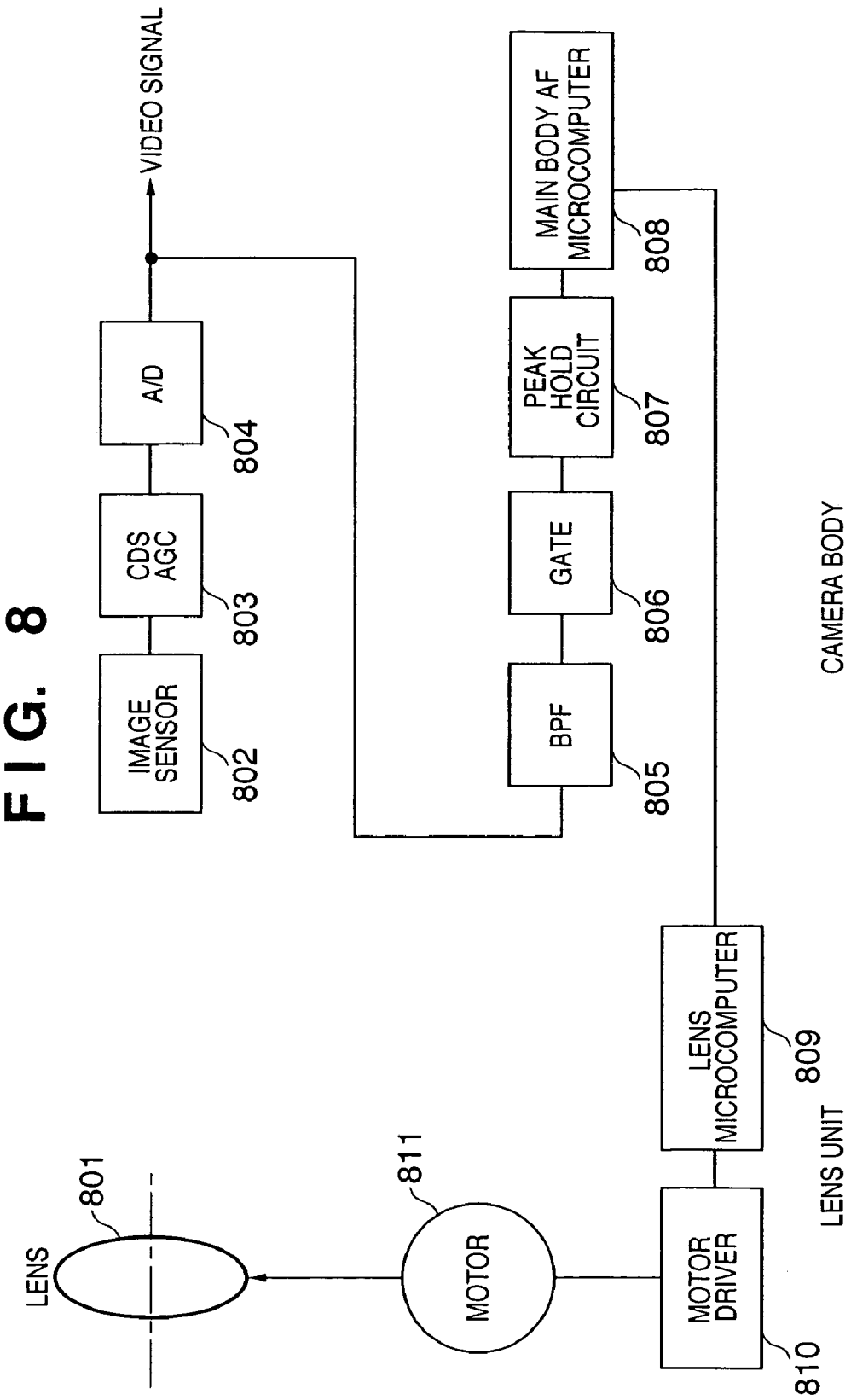

BASIC FILTER CHARACTERISTIC

FILTER CHARACTERISTIC CHANGE

FILTER CHARACTERISTIC WITH SMALL BANDWIDTH

HILL-CLIMBING CHARACTERISTIC OF FILTER WITH SMALL BANDWIDTH

IMAGE SENSING APPARATUS, CONTROL METHOD THEREFOR, AND AUTOMATIC FOCUS ADJUSTING DEVICE FOR IMAGE SENSING APPARATUS

FIELD OF THE INVENTION

The present invention relates to a lens-unit-exchangeable image sensing apparatus and an automatic focus adjusting device for this apparatus.

BACKGROUND OF THE INVENTION

As an automatic focus adjusting device conventionally used for a video apparatus such as a video camera, a device based on a so-called hill-climbing scheme (TTL autofocus) is known, which performs focus adjustment by extracting a high-frequency component from a vide signal obtained from an image sensor such as a CCD and driving a photographing lens so as to maximize the high-frequency component. Such an automatic focus adjustment scheme has merits such as requiring no special optical member for focus adjustment and accurately adjusting the focus at a long or short distance, i.e., regardless of distance.

A case wherein this type of automatic focus adjustment processing is used for a lens-exchangeable video camera will be described with reference to FIG. 8.

Referring to FIG. 8, reference numeral 801 denotes a focusing lens, which is moved in the optical direction by a lens driving motor 811 to perform focus adjustment. Light passing through this lens is formed into an image on the image sensing plane of an image sensor 802 and is photoelectrically converted into an electrical signal. This signal is output as a video signal. This video signal is sampled/held and amplified to a predetermined level by a CDS/AGC 803. The resultant signal is converted into digital video data by an A/D converter 804. The data is input to the process circuit of the camera to be converted into a standard television signal and input to a bandpass filter 805 (to be referred to as a BPF hereafter). The BPF 805 extracts a high-frequency component from the video signal. A gate circuit 806 extracts only a signal corresponding to a portion set in a focus detection area in a frame, and a peak hold circuit 807 holds peaks at intervals synchronized with an integral multiple of a vertical sync signal, thereby generating an AF evaluate value. This AF evaluate value is input to a main body AF microcomputer 808, which in turn determines a motor driving direction so as to increase the focusing speed and AF evaluate value in accordance with the degree of focusing. The speed and direction of the focusing motor are sent to a lens microcomputer 809. The lens microcomputer 809 performs focus adjustment by causing a motor 811 to move the focusing lens 801 in the optical axis direction through a motor driver 810 in accordance with an instruction from the main body. AF microcomputer 808.

According to the above prior art, the camera body incorporates a control mechanism for automatic focus adjustment, and determines an automatic focus adjustment response characteristic or the like so as to optimize the focus within a limited specific lens unit range. When this limited lens unit is exchanged with a lens unit other than the limited lens unit, it is difficult to realize the optimal performance of the camera.

In contrast to this, in a lens-unit-exchangeable camera system, there is provided a technique of generating AF evaluation information instead of generating an AF driving signal for the camera body, and making each lens unit perform focusing independently of the camera body (e.g., Japanese Patent Laid-Open No. 9-9130).

In the prior art described in the above reference, however, the following problems arise.

First of all, if the time frames in which a camera body and a lens unit have been developed are relatively close to each other, no considerable problem arises because the position resolution of the focusing lens in the lens unit is determined in accordance with the specifications of the image sensing system of the camera in which the lens unit is mounted.

However, image sensors mounted on recent cameras have increased in miniaturization and packing density. If, therefore, a succeeding device (let's say, the second device) is to be developed several years after the development of the first device, an image sensor which has increased in miniaturization and packing density as compared with the previous generation is selected as an image sensor used for the second device. In other words, the pixel pitch and permissible circle of confusion of the image sensor of the second device are reduced.

If, therefore, an old lens unit in which the position resolution of the focusing lens is determined in accordance with the permissible circle of confusion of the first device is to be mounted on the camera body of the second device to be developed, since the permissible circle of confusion of the second device is small, a video taken by the device is influenced by movement such as wobbling caused by the micro-motion of the focusing lens when autofocus (AF) operation is performed.

In addition, even if the permissible circle of confusion determined by the pixel pitch of the image sensor of the camera body is the same as that of the first device, the effective pixel density of a sensed image increases, and the effective permissible circle of confusion decreases, resulting in the occurrence of a phenomenon similar to that described above, when, for example, a single image sensor (CCD) system is replaced with a triple-CCD system, or when a so-called "pixel shifting" system is used, in which the mount positions of the respective RGB CCDs are shifted from each other by a distance corresponding to ½ pixel in the triple-CCD system, and pixel interpolation is performed to increase the resolution.

SUMMARY OF THE INVENTION

The present invention has been made to solve the above problems, and has as its object to provide a technique of stably focusing on any desired main object without any sense of discomfort under any image sensing conditions regardless of how a lens unit and camera body developed in different periods are combined.

According to the first aspect of the present invention, there is provided an automatic focus adjusting device for a lens-unit-exchangeable image sensing apparatus which includes extraction means for extracting one or a plurality of focus signals in one or a plurality of focus detection areas within a frame from an image sensing signal output from image sensing means, control means for determining a driving direction in which a focusing lens of an optical system is driven to a focused focal point and a driving speed on the basis of an increase/decrease in level of a signal output from the extraction means, and driving means for driving the focusing lens on the basis of the control means, has the control means and the driving means in a lens unit, and transfers an output from the extraction means to the lens unit, characterized in that an extraction characteristic of the extraction means is changed in accordance with type information of a mounted lens unit to be combined.

According to the second aspect of the present invention, in the automatic focus adjusting device described in the first aspect, when the focusing lens is driven in one direction to change a focusing state from a blurring state to a blurring state through a focused state, the extraction characteristic of the extraction means is changed, in an increasing/decreasing curve shape plotted by a focus signal level which changes in accordance with a focusing state, so as to change a sharpness of the increasing/decreasing curve shape.

According to the third aspect of the present invention, the automatic focus adjusting device described in the second aspect is characterized in that the extraction characteristic of the extraction means changes a gain of a band component to be extracted.

According to the fourth aspect of the present invention, the automatic focus adjusting device described in the second aspect is characterized in that the extraction characteristic of the extraction means changes a bandwidth without changing a center frequency of a band component to be extracted.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A and 5B are views each showing the correspondence between lens units and camera bodies;

FIG. 8 is a block diagram showing the arrangement of a conventional camera apparatus;

DETAILED DESCRIPTION OF THE PREFERRED EMBODIMENTS

An embodiment of the present invention will be described in detail below with reference to the accompanying drawings.

Figure 1:
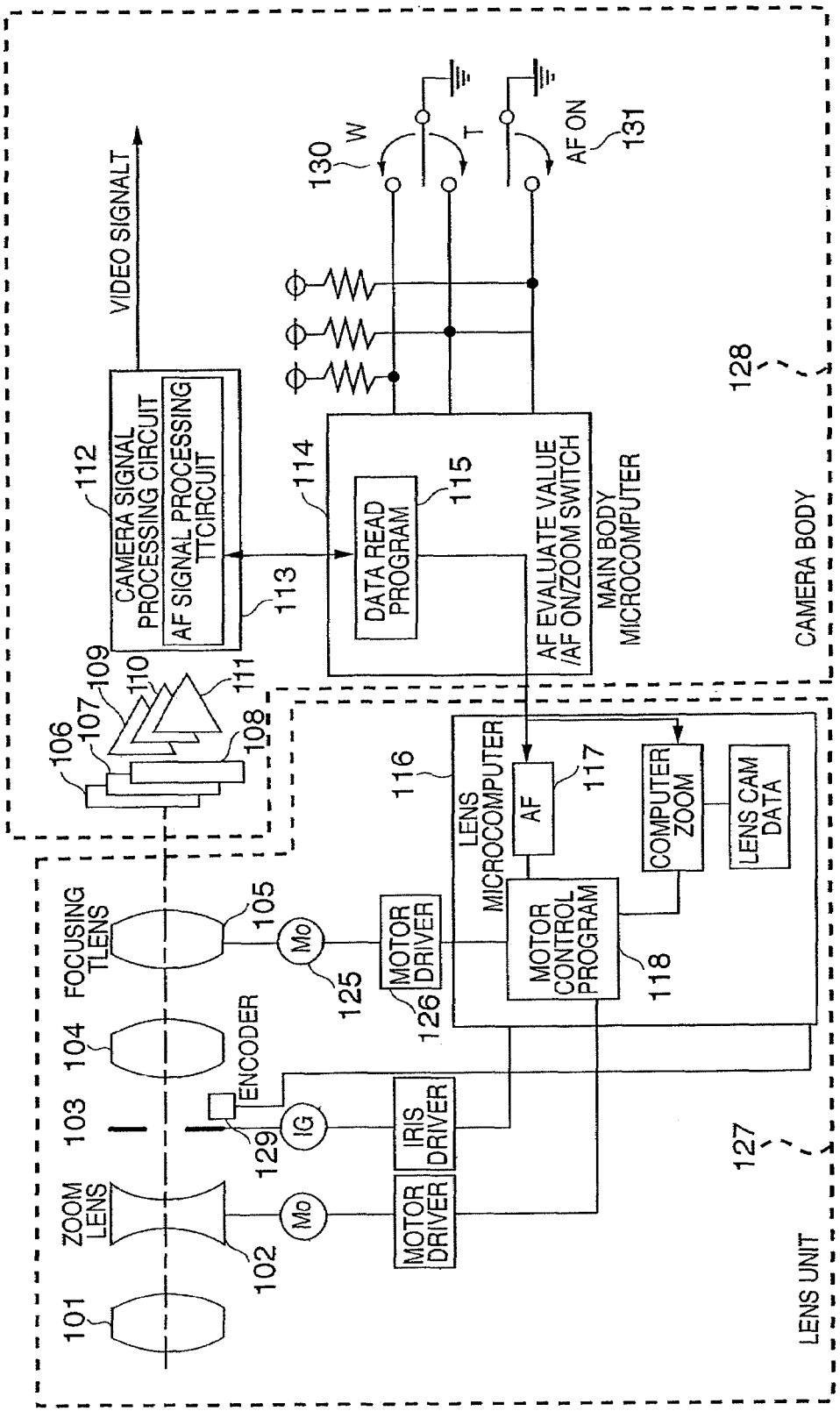
FIG. 1 is a block diagram showing the arrangement of an image sensing system according to an embodiment.

FIG. 1 is a view showing the arrangement of an image sensing system according to an embodiment of the present invention. Referring to FIG. 1, reference numeral 128 denotes a digital video camera body (to be simply referred to as a camera body hereinafter); and 127, an exchangeable lens unit. Connection terminals are provided for the respective connecting portions of the camera body 128 and lens unit 127. When the lens unit 127 is mounted on the camera body 128, the connection terminals are electrically connected to each other.

Light from an object to be imaged passes through a first lens group 101 fixed in the lens unit, a second lens group 102 which is movable and performs magnifying operation, an aperture 103, a fixed third lens group 104, and a fourth lens group 105 (to be referred to as a focusing lens hereinafter) which is movable and has both a focus adjustment function and a compensation function of compensating for the movement of a focal plane upon magnifying operation. Of three primary color components, a red (R) component is imaged on an image sensor 106 such as a CCD, a green (G) component is imaged on an image sensor 107 such as a CCD, and a blue (B) component is imaged on an image sensor 108 such a CCD.

The respective images on the image sensors are photoelectrically converted and amplified to optimal levels by amplifiers 109, 110, and 111, respectively. The amplified signals are supplied to a camera signal processing circuit 112 to be converted into a standard television signal, and are also supplied to an AF signal processing circuit 113.

The AF evaluate value information generated by the AF signal processing circuit 113 is read by a data read program 115 in a main body microcomputer 114 and transferred to a lens microcomputer 116. The main body microcomputer 114 reads signals from a zoom switch 130 and AF switch 131, and sends the status of each switch to the lens microcomputer 116.

In the lens microcomputer 116, an AF program 117 receives the status of the AF switch 131 and the AF evaluate value information from the main body microcomputer 114. When the AF switch 131 is ON, the AF program 117 causes a focus motor driver 126 to drive a focus motor 125 through a motor control program 118 on the basis of the AF evaluate value, thereby moving the focusing lens 105 in the optical axis direction and performing focus adjustment.

Figure 2:
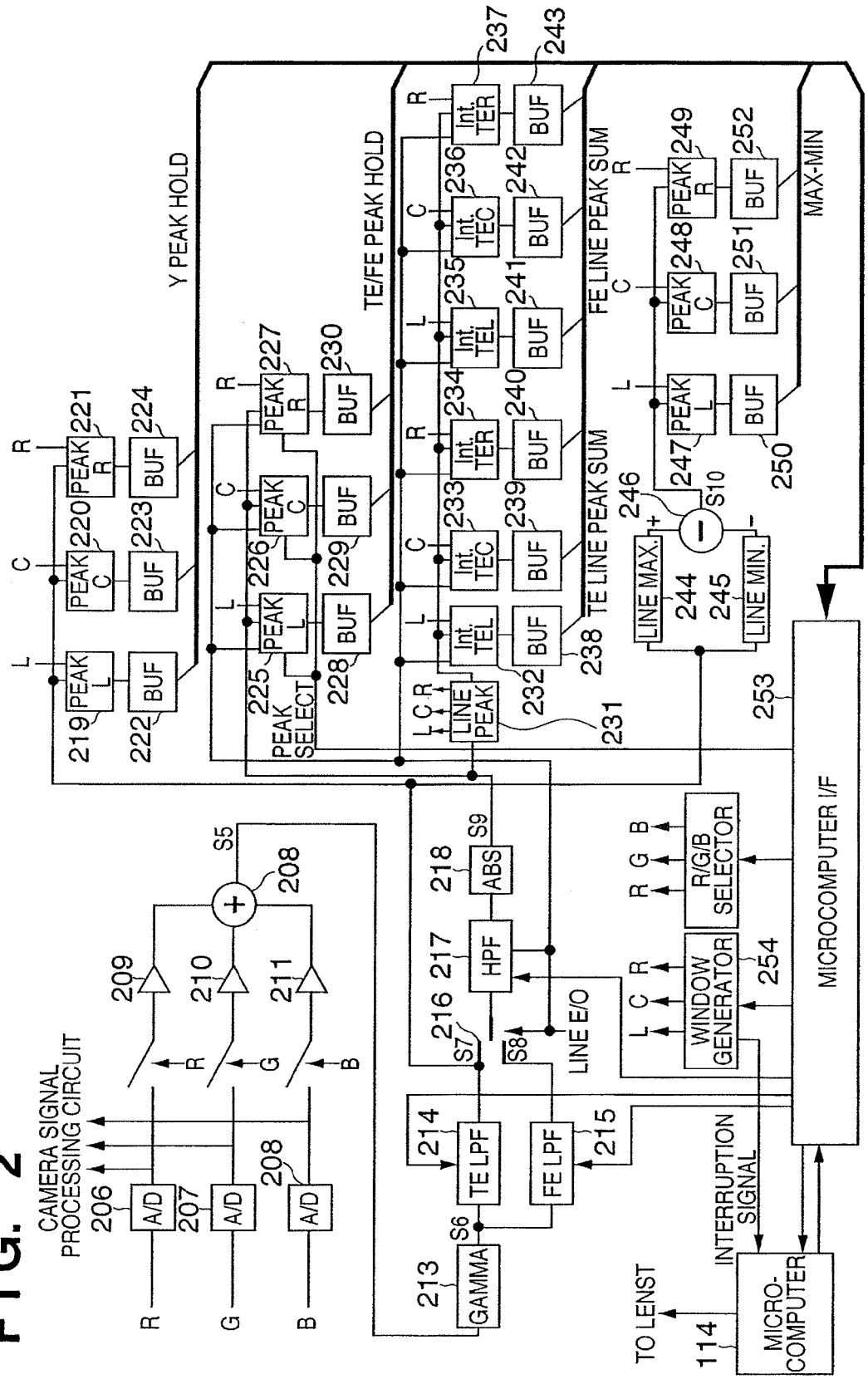
FIG. 2 is a circuit diagram showing the details of an AF signal processing circuit according to this embodiment.
Figure 3:
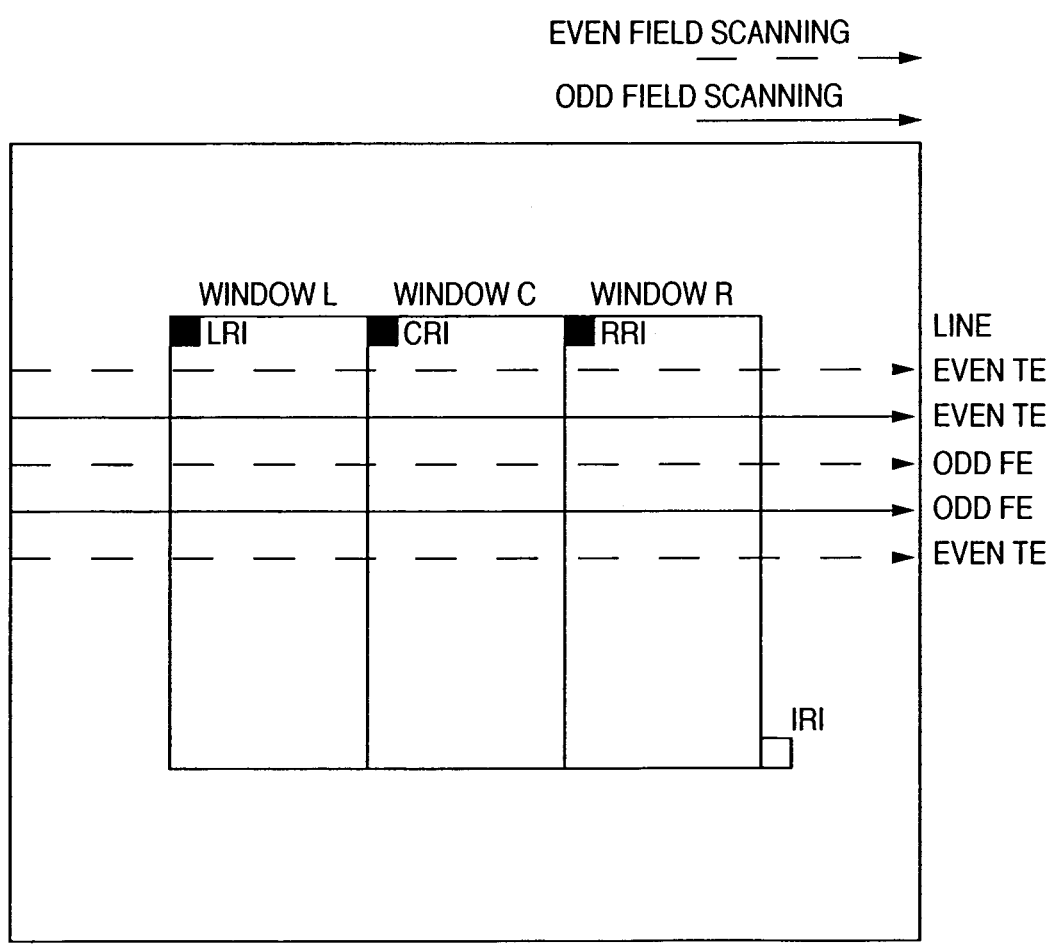
FIG. 3 is a view showing an AF evaluation area in an image sensor.

FIG. 2 is a view showing the AF signal processing circuit 113 in detail. FIG. 3 is a view showing the AF evaluation area of each image sensor and the processing timing of the AF signal processing circuit 113.

Referring to FIG. 3, the outer window is an effective video frame output from each of the image sensors 106, 107, and 108. The inner window which is divided into three parts is a gate window for focus adjustment. A window generator 254 outputs gate signals indicating a left window L, a central window C, and a right window R. Reset signals LR1, CR1, and RR1 are generated at the start positions of the respective windows to reset integrators, peak/hold circuits, and the like (to be described later). The window generator 254 also generates a signal IR1 indicating the end of evaluation processing for one frame to transfer each integral value and a peak hold value to each buffer. In addition, each even field is represented by a solid line, and each odd field is represented by a dotted line. For each even line, a TE_LPF output is selected. For each odd line, an FE_LPF output is selected. Each component in FIG. 2 will be described together with FIG. 3.

The red (R), green (G), and blue (B) CCD output signals which are amplified to optimal levels by the amplifiers 109, 110, and 111 are respectively converted into digital signals by A/D converters 206, 207, and 208. The digital signals are sent to the camera signal processing circuit 112. In addition, these digital signals are properly amplified by amplifiers 209, 210, and 211 and added by an adder 208. With this operation, an automatic focus adjustment luminance signal S5 is generated. A gamma circuit 213 receives the signal S5 and performs gamma conversion with a predetermined gamma curve to generate a signal S6 in which a low-luminance component is emphasized and a high-luminance component is suppressed. The gamma-converted signal S6 is supplied to a TE-LPF 214 which is an LPF with a high cutoff frequency and to an FE-LPF 215 which is an LPF with a low cutoff frequency. The main body microcomputer 114 sets parameters representing the respective filter characteristics, which are determined through a microcomputer interface 253, to the TE-LPF 214 and FE-LPF 215, thereby generating output signals S7 and S8 indicating the low-frequency component of the signal S6.

The signals S7 and S8 are supplied to a switch 216. The switch 216 outputs one of the signals S7 and S8 to a high-pass filter (to be referred to as an HPF hereinafter) 217 in accordance with a Line E/O signal which is a signal for identifying a horizontal line as an even or odd line. In this embodiment, the switch 216 passes the signal S7 to the HPF 217 at a timing which indicates an even line of a video signal, and passes the signal S8 to the HPF 217 at a timing which indicates an odd line.

The HPF 217 extracts only a high-frequency component with a filter characteristic for an odd/even line determined by the microcomputer 114 through the microcomputer interface 253. An absolute value circuit 218 converts the resultant signal into an absolute value signal to generate a positive signal S9. The signal S9 is supplied to peak hold circuits 225, 226, and 227 and a line peak hold circuit 231.

The window generator 254 generates gate signals indicating windows L, C, and R for focus adjustment at positions in a frame like that shown in FIG. 3.

The gate signal indicating the window L which is output from the window generator 254 and the Line E/O signal, which is a signal for identifying a horizontal line as an even or odd line, are input to the peak hold circuit 225. As shown in FIG. 3, the peak hold circuit 225 is initialized at a position LR1 on the upper left corner of the window L for focus adjustment. The peak hold circuit 225 holds the peak of the signal S9 in each window which corresponds to an even or odd line designated by the microcomputer through the microcomputer interface 253, and stores, in a buffer 228, a TE peak evaluate value and FE peak evaluate value (to be referred to as a TE/FE evaluate value) in the window L at a timing IR1.

Likewise, the window C gate signal which is output from the window generator 254 and the Line E/O signal are input to the peak hold circuit 226. The peak hold circuit 226 is initialized at a position CR1 on the upper left corner of the window C for focus adjustment shown in FIG. 3. The peak hold circuit 226 holds the peak of the signal S9 in each window which corresponds to an even or odd line designated by the microcomputer through the microcomputer interface 253, and stores, in a buffer 229, a peak hold value (TE/FE peak evaluate value) in the window C at the timing IR1.

In addition, likewise, the window R gate signal which is output from the window generator 254 and the Line E/O signal are input to the peak hold circuit 227. The peak hold circuit 227 is initialized at a position RR1 on the upper left corner of the window R for focus adjustment shown in FIG. 3. The peak hold circuit 227 holds the peak of the signal S9 in each window which corresponds to an even or odd line designated by the microcomputer through the microcomputer interface 253, and stores, in a buffer 230, a peak hold value (TE/FE peak evaluate value) in the window R at the timing IR1.

The line peak hold circuit 231 receives the signal S9 and the windows L, C, and R output from the window generator 254, and is initialized at the start points in the respective windows in the horizontal direction. The line peak hold circuit 231 then holds the peak value in one line of the signal S9 in each window. Outputs from the line peak hold circuit 231 and the Line E/O signals each identifying a horizontal line as an even or odd line are input to integrators 232 to 237. At the same time, signals indicating a window generator output window L, window generator output window C, and window generator output window R are respectively input to the integrators 232 and 235, the integrators 233 and 236, and the integrators 234 and 237.

The integrator 232 is initialized at the upper left position LR1 which is the start position of the window L for focus adjustment, and cumulatively adds line peak hold circuit outputs in the internal register immediately before the end of an even line within the window. The integrator 232 stores a line peak integration value as the addition result in a buffer 238 at the timing IR1. The integrator 233 is initialized at the upper left position CR1 which is the start position of the window C for focus adjustment, and cumulatively adds line peak hold circuit outputs in the internal register immediately before the end of an even line within the window. The integrator 233 stores a line peak integration value as the addition result in a buffer 239 at the timing IR1. The integrator 234 is initialized at the upper left position RR1 which is the start position of the window R for focus adjustment, and cumulatively adds line peak hold circuit outputs in the internal register immediately before the end of an even line within the window. The integrator 234 stores a line peak integration value as the addition result in a buffer 240 at the timing IR1.

The integrators 235, 236, and 237 add odd line data and transfer the results in buffers 241, 242, and 243, respectively, while the integrators 232, 233, and 234 add even line data.

The signal S7 is input to peak hold circuits 219, 220, and 221, a line maximum value hold circuit 244, and a line minimum value hold circuit 245.

The peak hold circuit 219 receives a window L gate signal output from the window generator 254, and is initialized at a timing LR1 on the upper left corner of the window L. The peak hold circuit 219 then holds the peak of the signal S7 within the window L. The peak hold circuit 219 stores the peak hold result (the maximum value within the window L) as a Y peak evaluate value in a buffer 222 at the timing IR1. Likewise, the peak hold circuit 220 receives a window C gate signal from the window generator 254, and is initialized at a timing CR1 on the upper left corner of the window C. The peak hold circuit 220 then holds the peak of the signal S7 within the window C. The peak hold circuit 220 stores the peak hold result as a Y peak evaluate value in a buffer 223 at the timing IR1. In addition, likewise, the peak hold circuit 221 receives a window R gate signal from the window generator 254, and is initialized at a timing RR1 on the upper left corner of the window R. The peak hold circuit 221 then holds the peak of the signal S7 within the window R. The peak hold circuit 221 stores the peak hold result as a Y peak evaluate value in a buffer 224 at the timing IR1.

The line maximum value hold circuit 244 and line minimum value hold circuit 245 receive the window L gate signal, window C gate signal, and window R gate signal from the window generator 254, and are initialized at the start points in the respective windows in the horizontal direction. The line maximum value hold circuit 244 and line minimum value hold circuit 245 then hold the maximum and minimum values of each line of the signal S7 in each window. The maximum and minimum values held by these circuits are input to a subtractor 246, which in turn calculates a differential signal S10 indicating "maximum value−minimum value". This signal is supplied to peak hold circuits 247, 248, and 249.

The peak hold circuit 247 receives the window L gate signal from the window generator 254 and is initialized at the timing LR1 on the upper left corner which is the start position in the window L. The peak hold circuit 247 holds the peak of the signal S10 in the window L, and stores the peak hold result as a Max–Min evaluate value in a buffer 250 at the timing IR1. Likewise, the peak hold circuit 248 receives the window C gate signal from the window generator 254 and is initialized at the timing CR1 on the upper left corner which is the start position in the window C. The peak hold circuit 248 holds the peak of the signal S10 in the window C, and stores the peak hold result as a Max–Min evaluate value in a buffer 251 at the timing IR1. In addition, likewise, the peak hold circuit 249 receives the window R gate signal from the window generator 254 and is initialized at the timing RR1 on the upper left corner which is the start position in the window R. The peak hold circuit 249 holds the peak of the signal S10 in the window R, and stores the peak hold result as a Max–Min evaluate value in a buffer 252 at the timing IR1.

As a result of the above operation, the pieces of evaluate value information are stored in the buffers 222 to 224, 228 to 230, 238 to 243, and 250 to 252. The window generator 254 outputs an interruption signal to the microcomputer 114 at the timing IR1. Upon receiving this interruption signal, the microcomputer 114 reads out the respective pieces of evaluate value information from the buffers 222 to 224, 228 to 230, 238 to 243, and 250 to 252 through the microcomputer interface 253 before next data are stored in the buffers, and transfers the respective pieces of information to the microcomputer 116 in synchronism with a vertical sync signal.

Figure 7:
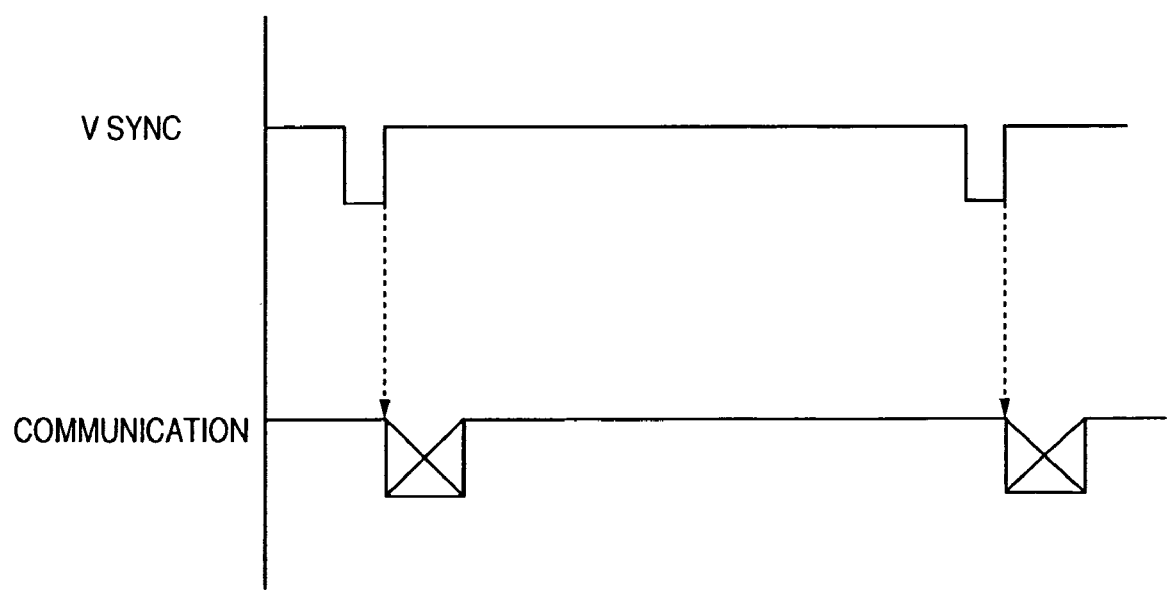
FIG. 7 is a flowchart showing the communication timing between a lens unit and a camera body in this embodiment.

FIG. 7 shows the communication timing between the camera body and the lens unit. As described above, the AF evaluate value information read by the microcomputer is transferred to the lens microcomputer in synchronism with a vertical sync signal (V sync signal) immediately after the vertical sync signal.

The manner of how the lens microcomputer 116 performs automatic focus adjusting operation by using the TE/FE peak evaluate value, TE line peak integration evaluate value, FE line peak integration evaluate value, Y peak evaluate value, and Max–Min evaluate value within each frame will be described next.

A TE/FE peak evaluate value is an evaluate value representing the degree of focusing. This value is a peak hold value and hence has a relatively small object dependence and is not influenced much by the blurring of the camera and the like. This value is optimal for a focusing degree determination and restart determination. A TE line peak integration evaluate value and FE line peak integration evaluate value each also represent the degree of focusing. Such a value is a stable evaluate value with less noise owing to an integration effect, and hence is optimal for direction determination. Of TE/FE peak evaluate values and TE/FE line peak integration evaluate values, the TE value is obtained by extracting higher frequency components, and hence is optimal for determination near a focused focal point. In contrast, the FE value is optimal for determination when large blurring occurs at a position distant from a focused focal point. In addition, a Y peak evaluate value and Max–Min evaluate value depend on an object without much depending on the degree of focusing, and hence are optimal for grasping the state of an object so as to reliably perform focusing degree determination, restart determination, and direction determination. That is, optimal control can be performed by determining with a Y peak evaluate value whether an object is a high-luminance object or low-luminance object, determining the magnitude of contrast with a Max–Min evaluate value, and performing correction by predicting the magnitudes of the peaks of a TE/FE peak evaluate value, TE line peak integration evaluate value, and FE line peak integration evaluate value. Version information representing these evaluate values and the types and contents of evaluate values is transferred from the camera body 128 to the lens unit 127. The lens microcomputer 116 in the lens unit then performs automatic focus adjusting operation.

Figure 4:
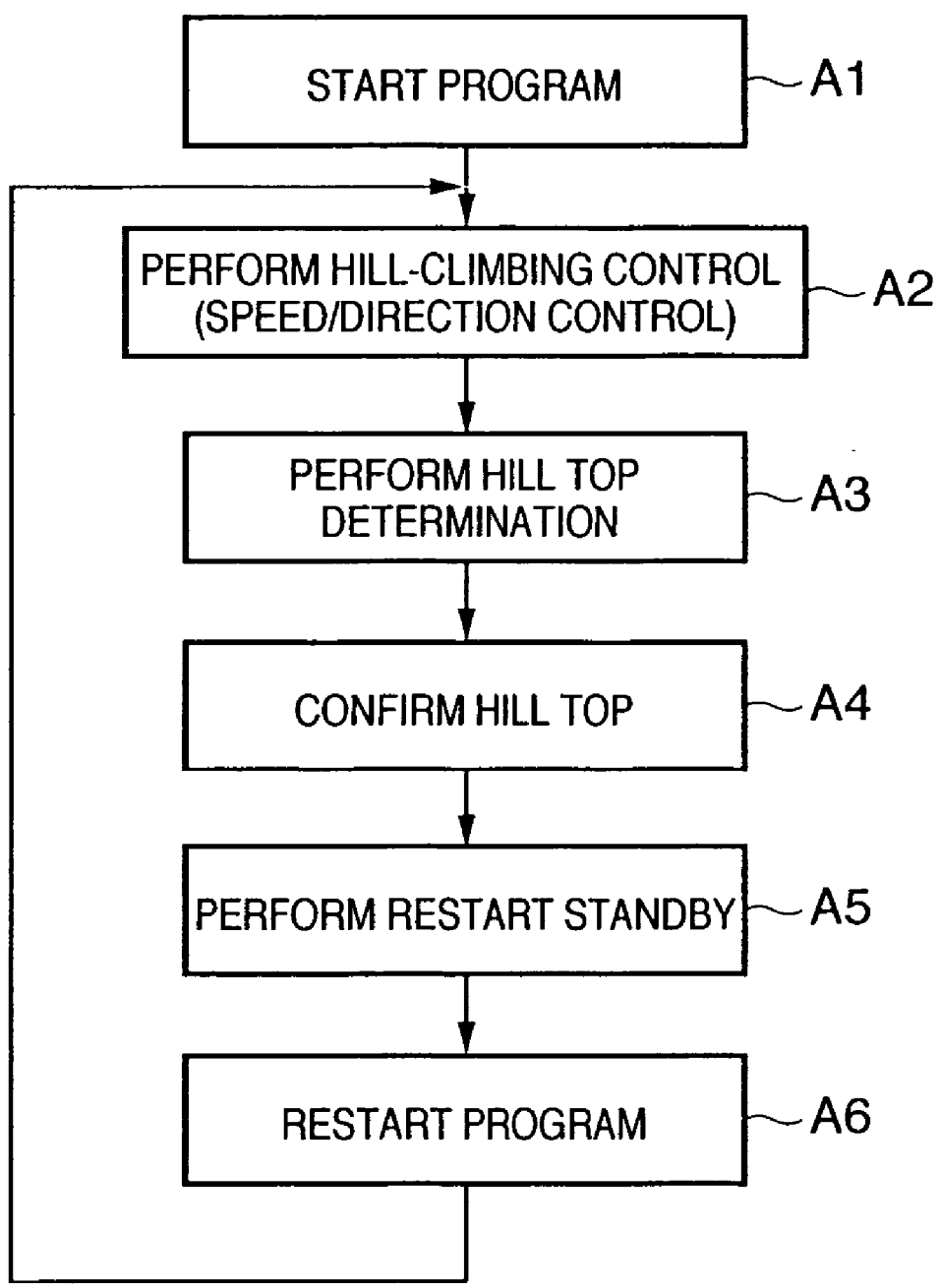
FIG. 4 is a flowchart showing the contents of processing performed by a lens microcomputer in a lens unit.

An algorithm for automatic focus adjusting operation of the AF program 117 which is executed by the lens microcomputer in the lens unit while no magnifying operation is performed will be described with reference to FIG. 4. Assume that the camera body supplies power to the lens unit.

The program is started first (step A1). Hill-climbing control is then performed by performing speed control at a level corresponding to a TE or FE peak, and performing direction control by mainly using a TE line peak integration evaluate value near the top of a hill and an FE line peak integration evaluate value at the foot of the hill (step A2). Hill top determination (A3) is performed by using the absolute value of a TE or FE peak evaluate value or the change amount of a TE line peak integration evaluate value, and focused focal point confirming operation is performed near the top of the hill (A4). The lens unit stops at the highest level and shifts to restart standby (step A5). In restart standby, when a decrease in the level of a TE or FE peak evaluate value is detected, the program is restarted (step A6). In this loop of automatic focus adjusting operation, the degree of speed control using a TE/FE peak, an absolute level for hilltop determination, the change amount of TE line peak integration evaluate value, and the like are determined on the basis of the magnitude of a hill which is predicted by object determination using a Y peak evaluate value and Max–Min evaluate value.

Figure 6:
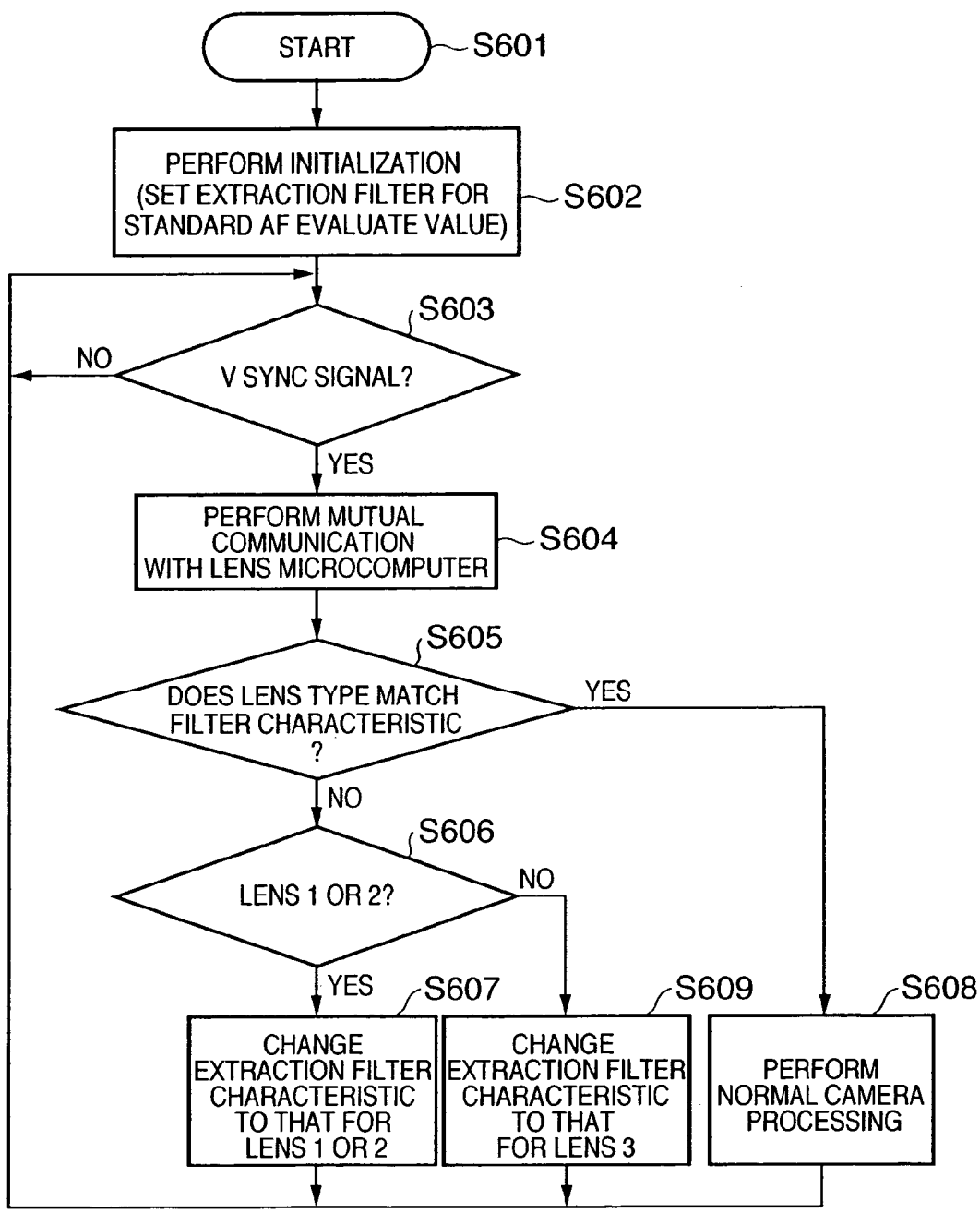
FIG. 6 is a flowchart showing the processing performed by a camera microcomputer in a camera body in this embodiment.

FIG. 6 is a flowchart for explaining a method of switching AF evaluate value characteristics in accordance with the type information of a mounted lens unit which is a characteristic feature of the present invention. This method is performed in the main body microcomputer 114.

Assume that the camera body has been developed after the development of the lens units, and permissible circle of confusion=α (the type of the camera 3 in FIG. 5A). Assume also that the lens units which can be mounted on the camera body have different position resolutions, which are set to have three or four stop positions within the focal depth determined by $$\text{focal depth} = \text{effective permissible circle of confusion} \times F_{no} \quad (1)$$

FIG. 5A shows the type information of camera bodies. These cameras have different permissible circles of confusion due to the differences in image sensing system among the cameras. In this case, the "effective" permissible circle of confusion means an apparent permissible circle of confusion calculated in terms of a spatial frequency on a monitor depending on whether a triple-CCD system is used, pixel shifting is performed, a sensed image is generated upon reduction in entire CCD image reception area, an image is extracted at 1:1 ratio, or a CCD with 720 (H)×480 (V) is used without any modification.

If, for example, pixel shifting is performed, the resolution of the CCD is increased by about 1.5 times that in this embodiment, and the effective permissible circle of confusion is reduced by a coefficient of {circle of confusion determined by CCD cell pitch}×Fno/1.5. In contrast, when an NTSC moving image is to be generated by reducing a CCD with 1440 (H)×960 (V), the permissible circle of confusion increases by an amount corresponding to the double of the resolution. FIG. 5A also shows the types of lens units which can be supported in correspondence with the types of cameras. Only lens units which exist when the respective cameras are put on the market will be supported. The flowchart of FIG. 6 is firmware built into camera 3, and camera 3 supports lenses 1, 2, and 3.

FIG. 5B shows the type information of lens units and, more specifically, shows effective permissible circles of confusion which can be handled by the respective lenses, and the type information of camera bodies to be supported. In this case, the camera bodies "to be supported" indicate the image sensing systems of the cameras in which focus position resolutions are satisfied in terms of effective permissible circle of confusion. FIG. 5B shows focus stop possible points within the focal depths of the respective cameras and a minimum movement unit in terms of control. Lens unit 3 supports all camera bodies 1, 2, and 3, and is provided with switching control for optimizing focus position resolution in accordance with the camera type. With respect to camera body 1, the minimum movement amount is three points. Camera bodies 2 and 3 are controlled with a unit of two points and a unit of one point, respectively.

On the other hand, lenses 1 and 2 support only camera body 1 and only camera bodies 1 and 2, respectively. Lens 1 has only one point as a stop position, and lens 2 has only two points as stop positions within the focal depth assumed from the effective circle of confusion of camera body 3. Although these lenses can form focused focal points, wobbling or the like near the focused focal points exceeds the focal depths. As a result, the movement in AF operation is seen as a change in video. Consider an object whose edge is emphasized, such as a glistening vertical line. When, for example, restart operation is performed as another object comes and goes, although the focus on the main object is maintained, the edge object changes in edge width as the focus moves, or appears to move, giving a restless impression. In addition, lenses 1 and 2 have already been on the market. Unlike lens 3, they cannot perform control for switching focus position resolutions by detecting camera body 3.

FIG. 6 is a flowchart for solving the problem that when lens 1 or 2 is mounted on camera body 3, the behavior of AF influences a video, resulting in making the video look awkward.

A characteristic point of this embodiment is that the generative characteristic is changed to an AF evaluate value in accordance with the type information of a mounted lens.

First of all, the program is started in step S601, and settings for generating an AF evaluate value concerning the main body microcomputer are made as initial settings in step S602 (setting filter characteristics for the TE-LPF 214, FE-LPF 215, and HPF 217, and determining a center frequency extracted as an AF evaluate value, an extraction bandwidth, and the gain of an extracted signal, as described in FIG. 2).

In the case of camera body 3, AF evaluate value extraction filter setting in step S602 is performed to set a standard bandwidth on the assumption of lens 3. In order to communicate with the lens microcomputer at the communication timing in FIG. 7, the flow waits for the arrival of a vertical sync signal in step S603. When the sync signal is generated, mutual communication is performed in step S604 to transmit the above evaluate values and exchange the type information shown in FIGS. 5A and 5B. That is, the camera body transmits its own type information to the lens unit, and receives the type information of the lens unit.

The reception of the type information of the mounted lens unit is not limited to the timing in FIG. 7, and may be performed at the timing when the power supply is turned on, and the exchanging of the lens unit is detected by a sensor (not shown).

In step S605, it is determined whether the pieces of the set lens type information and the set AF evaluate value extraction characteristics match each other. If the mounted lens is lens 3, since the extraction characteristics set in step S602 match each other, the flow advances to step S608 to execute normal control on the camera, and waits for the arrival of the next vertical sync signal in step S603.

If it is determined in step S605 that the mounted lens is not lens 3, the flow advances to step S606 to check whether the lens type information indicates lens 1 or 2. If it is determined that lens 1 or 2 is mounted, the flow advances to step S607 to change the AF evaluate value extraction characteristic to that for lens 1 or 2 and switch the characteristics of the TE-LPF 214, FE-LPF 215, and HPF 217 in FIG. 2 to predetermined characteristics, and returns to step S603.

In the next communication, therefore, since it is determined in step S605 that the version on the camera body side coincides with the version of the lens microcomputer, the processing in step S608 can be performed.

When lens 1 or 2 is detached from the camera body, and lens 3 is mounted on the camera body, it is determined in step S605 that the pieces of lens type information and the extraction characteristics do not match each other, and the flow advances to step S606. However, since lens 3 is mounted on the camera body this time, standard evaluate value extraction characteristics for lens 3 are set, and the characteristics of the TE-LPF 214, FE-LPF 215, and HPF 217 in FIG. 2 are switched to predetermined characteristics in step S609. The flow then returns to step S603.

The operation of switching AF evaluate value extraction characteristics for each lens type has been described with reference to the flowchart of FIG. 6. The differences between the extraction characteristic for lens 3 and the evaluate value extraction characteristic for lens 1 or 2 will be described with reference to FIGS. 9A to 9E and FIGS. 10A to 10C.

Figure 9A:
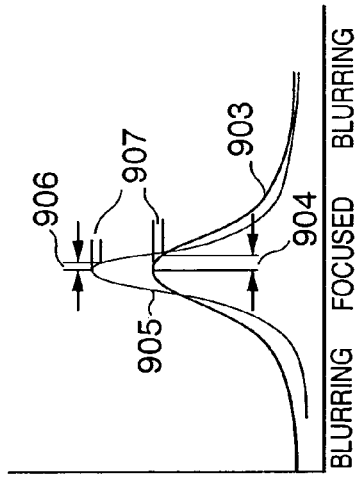
FIGS. 9A to 9E are graphs showing the generation of evaluation information by gain adjustment and the principle of why the moving distance of the focusing lens of a lens unit is reduced by evaluation information.

The extraction characteristic for lens 3 which is set in step S602 in FIG. 6 is a basic filter characteristic 901 in FIG. 9A. This characteristic is a characteristic for extracting an evaluate value component on the high-frequency side which is formed by the TE-LPF 214 and HPF 217, and is determined by a center frequency and bandwidth. This frequency is used to determined a characteristic for smoothly reaching a focused focal point in accordance with the spatial frequency resolved in the image reception device, the focusing precision of AF, and a blurring state (reference numeral 903 in FIG. 9D).

Even camera bodies having different image sensing systems can be standardized to some extent by gain setting such that the evaluate value levels obtained when standard chart imaging is performed become equal to each other. Using such standardized AF evaluate values makes it unnecessary to change parameters used for AF control in the lens unit for each type of lens unit even if different camera bodies are mounted on a lens unit.

However, different focus position resolutions are set for lens 1 or 2 and lens 3, which are lens units, in this embodiment, and the resolution of lens 1 or 2 is insufficient with respect to the effective permissible circle of confusion of camera 3. In this case, by raising a center frequency gain characteristic, as indicated by reference numeral 902 in FIG. 9B, a sharp AF evaluate value characteristic is generated, as indicated by reference numeral 905 in FIG. 9C. As a result, with respect to a change of a blurring level 907, a focus movement amount 906 of the characteristic 905 can be made smaller than a focus movement amount 904 of a basic evaluate value characteristic 903. That is, since the movement amount of the focusing lens is small, the influence of the movement on a video during AF processing is small.

In actual AF operation, therefore, the focus movement range for checking a focus near a focused focal point can be reduced in terms of effective permissible circle of confusion. This can therefore prevent the problem that the movement of the focusing lens is seen on frames, in various kinds of shooting scenes.

Figure 9B:
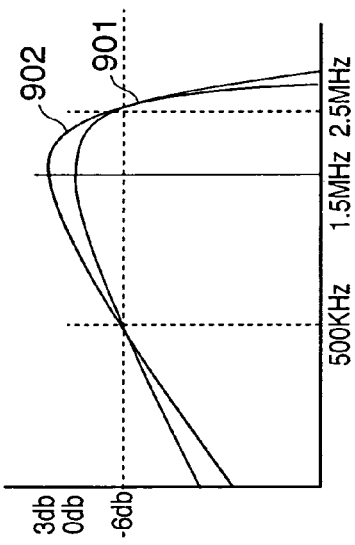
Figure 9D:
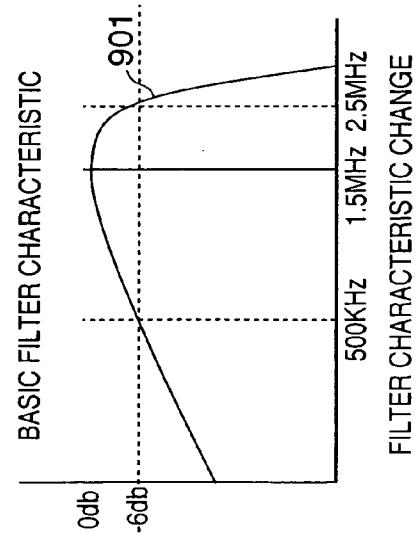
Figure 9C:
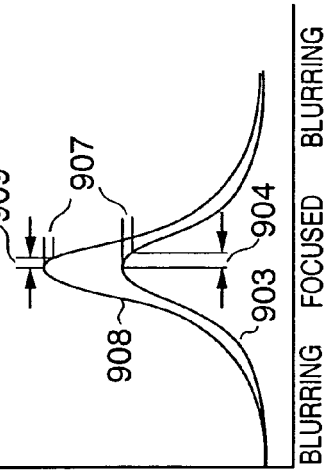
Figure 9E:
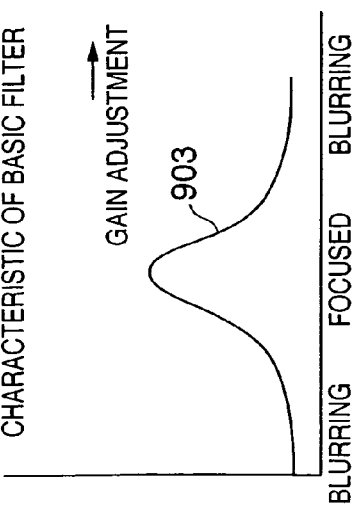

Referring to FIG. 9B, the center frequency extraction gain of an extraction filter is changed. As shown in FIG. 9E, a defocus characteristic may be obtained in a sharp AF evaluate value characteristic like that shown in FIG. 9C by increasing a uniform gain setting to a standardization level or more when the gain setting is standardized in the above manner. By applying a uniform gain to the basic evaluate value characteristic, the shape of the characteristic 903 becomes that of a defocus characteristic like that indicated by reference numeral 908. At this time, with respect to the change of the blurring level 907, a focus movement amount 909 of the characteristic 908 can be made smaller than the focus movement amount 904 of the basic evaluate value characteristic 903.

The technique of switching gains at the time of band extraction of an AF evaluate value in accordance with the type of lens to be mounted has been mainly described above with reference to FIGS. 9A to 9E. However, the present invention is not limited to this. For example, the bandwidth may be changed instead of the gain.

Figure 10A:
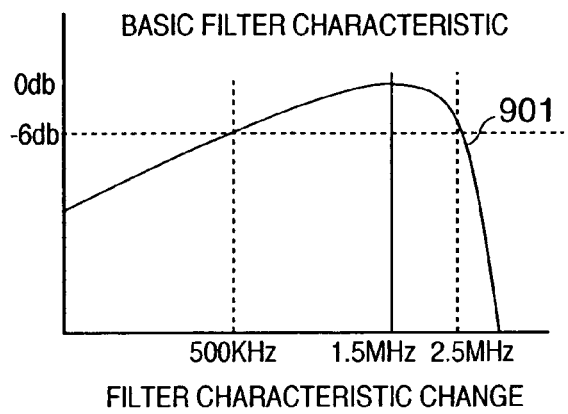
FIGS. 10A to 10C are graphs showing the generation of evaluation information by bandwidth adjustment and the principle of why the moving distance of the focusing lens of a lens unit is reduced by evaluation information.
Figure 10B:
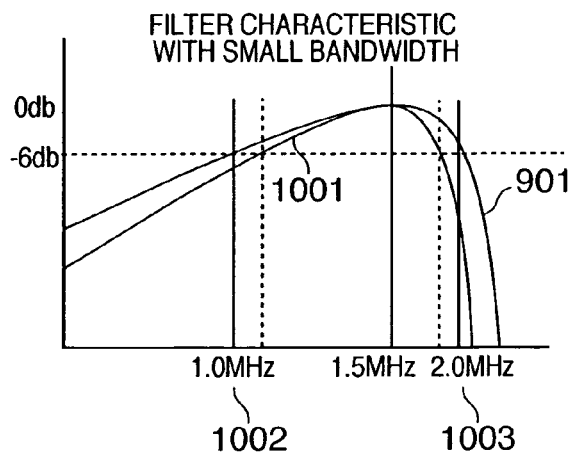
Figure 10C:
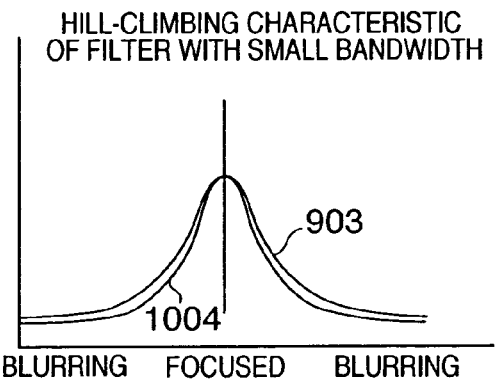

FIG. 10A shows a basic extraction filter characteristic (denoted by reference numeral 901) similar to that shown in FIG. 9A. According to this characteristic, the center frequency is set to 1.5 MHz, and the bandwidth is set to 500 kHz to 2.5 MHz with reference to a point of −6 dB. This bandwidth is reduced as indicated by reference numeral 1001 in FIG. 10B. In this example, the bandwidth is reduced to 1 MHz (1002) to 2 MHz (1003), and the AF evaluate values extracted by this filter become a sharp defocus characteristic compared with the characteristic 903, as indicated by reference numeral 1004 in FIG. 10C. This can therefore prevent the movement at the time of AF operation from being seen on frames.

The two cases, i.e., the case of changing the gain characteristic of the evaluate value extraction filter and the case of changing the bandwidth characteristic of the evaluate value extraction filter, have been described above. However, these cases are not mutually exclusive, and may be combined. That is, any technique can be used as long as the sharpness (Q value) of the evaluate value defocus characteristic can be changed.

As has described above, according to this embodiment, there can be provided a lens-exchangeable camera system which can suppress the movement in AF operation from being seen by using the technique of changing the extraction means characteristic for extracting evaluate values so as to make the AF evaluate value characteristic sent from the camera body have a sharp shape as a defocus characteristic when a lens with a focus position resolution insufficient for the effective permissible circle of confusion of the camera body is mounted on the camera body, and hence can realize smooth AF without any sense of discomfort even if an old lens complying with past camera specifications is mounted. This system can be provided as a camera system with a high degree of satisfaction in which even when the user purchases a new camera with high resolution/high performance/high value added based on the latest image sensing technique, he/she can smoothly shift to the use of the new camera while making the most of old lenses as resources which the user possesses.

As has been described above, according to the present invention, a camera body with a reduced permissible circle of confusion is provided with a means for detecting the type information of a mounted lens unit, and when the position resolution of the focusing lens of the lens unit does not match the permissible circle of confusion, changing the AF evaluate value generative characteristic such that the hill shape of the defocus characteristic of an AF evaluate value transferred from the camera body to the lens unit becomes a sharper shape (which increases the Q value). This makes it possible to make the defocus characteristic of an AF evaluate value become a sharp hill shape. Therefore, the amount of shift from a focused focal point at the peak of the hill to a focusing lens position where the AF evaluate value decreases by a predetermined level can be reduced in amplitude as compared with the case wherein the hill shape is flat. This makes it possible to reduce the range of position changes upon AF operation near a focused focal point by only changing the AF evaluate value generative characteristic of the camera body without changing the AF control on the lens unit side, thereby preventing the movement in AF operation from being seen. In addition, according to the present invention, a lens-exchangeable camera system can be provided, which can obtain a high-pixel-density, high-performance sensed image without losing lens units as resources which were purchased in the past. This makes it possible to provide as merchandise a user-friendly camera system which does not force the user to waste expenditure.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-217774 filed on Jul. 26, 2004, which is hereby incorporated by reference herein.

What is claimed is:

1. An image sensing apparatus which can exchange a lens unit which includes a control unit for determining a driving direction in which a focus lens of an optical system is driven to a focused focal point and determining a driving speed on the basis of an increase/decrease in level of a sign of an AF evaluate value output from said image sensing apparatus and a driving unit for driving the focusing lens on the basis of the determination of said control unit, said apparatus comprising:
    an extraction unit configured to extract one or a plurality of focus signals in one or a plurality of focus detection areas within a frame from an image sensing signal output from an image sensing unit; and
    a transmitting unit configured to transmit to said lens unit said signals extracted by said extraction unit, as the AF evaluate value;
    wherein an extraction characteristic of said extraction unit is changed in accordance with a type of said lens unit, and
    wherein when the focusing lens is driven in one direction to change a focusing state from a blurring state to a blurring state through a focused state, the extraction characteristic of said extraction means is changed, in an increasing/decreasing curve shape plotted by a focus signal level which changes in accordance with a focusing state, so as to change a sharpness of the increasing/decreasing curve shape.

2. The apparatus according to claim 1, wherein the extraction characteristic of said extraction unit changes a gain of a band component to be extracted.

3. The apparatus according to claim 1, wherein the extraction characteristic of said extraction unit changes a bandwidth without changing a center frequency of a band component to be extracted.

4. An image sensing apparatus which has an image sensing unit and serves as a camera body on which a lens unit is detachably mounted, the apparatus comprising:
 connecting terminals for connecting said lens unit to said camera body, said lens unit incorporating a lens microcomputer which executes position adjustment of a focusing lens independently of the camera body on the basis of AF evaluate value information transmitted from the camera body;
 a determination unit configure to determine a type of the connected lens unit;
 an adjustment unit configured to adjust a sharpness of the AF evaluate value information having a hill shaped curve through the connected lens unit on the basis of video data sensed by said image sensing unit and a determination result obtained by said determination unit; and
 a transmission unit configured to transmit the AF evaluate value information adjusted by said adjustment unit to the connected lens unit.

5. The apparatus according to claim 4, wherein said adjustment unit adjusts a gain of a predetermined frequency in a frequency band of video data within a predetermined area in said image sensing unit.

6. The apparatus according to claim 4, wherein said adjustment unit adjusts a frequency bandwidth of video data within a predetermined area in said image sensing unit.

7. A control method for an image sensing apparatus which serves as a camera body on which a lens unit is detachably mounted and includes an image sensing unit and connecting terminals for connecting the camera body to the lens unit, the lens unit incorporating a lens microcomputer which executes position adjustment of a focusing lens independently of a camera body on the basis of AF evaluate value transmitted from the camera body, the method comprising:
 determining a type of the connected lens unit;
 adjusting a sharpness of AF evaluate value information having a hill shaped curve through the connected lens unit on the basis of video data sensed by the image sensing unit and a determination result obtained in the determining step; and
transmitting the AF evaluate value information adjusted in the adjusting step to the connected lens unit.

\* \* \* \* \*